United States Patent
Fujino et al.

(10) Patent No.: US 11,811,356 B2
(45) Date of Patent: Nov. 7, 2023

(54) METHOD FOR INSTALLING SOLAR CELL MODULE

(71) Applicant: TOYO ALUMINIUM KABUSHIKI KAISHA, Osaka (JP)

(72) Inventors: Takaaki Fujino, Osaka (JP); Daisuke Maeda, Osaka (JP); Hiroyuki Sakamoto, Osaka (JP); Takahiro Imamura, Osaka (JP); Soichiro Tanaka, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 360 days.

(21) Appl. No.: 16/648,054

(22) PCT Filed: Sep. 14, 2018

(86) PCT No.: PCT/JP2018/034114
§ 371 (c)(1),
(2) Date: Mar. 17, 2020

(87) PCT Pub. No.: WO2019/059112
PCT Pub. Date: Mar. 28, 2019

(65) Prior Publication Data
US 2020/0266758 A1    Aug. 20, 2020

(30) Foreign Application Priority Data

Sep. 19, 2017   (JP) ................................. 2017-179351

(51) Int. Cl.
*H02S 30/10*      (2014.01)
*H02S 20/23*      (2014.01)
(Continued)

(52) U.S. Cl.
CPC .............. *H02S 30/10* (2014.12); *E04D 13/00* (2013.01); *F16M 13/02* (2013.01); *H02S 20/23* (2014.12)

(58) Field of Classification Search
CPC .... H02S 30/10; H02S 20/23; F24S 2025/014; F24S 25/20
(Continued)

(56) References Cited

U.S. PATENT DOCUMENTS

| 2011/0252724 A1 | 10/2011 | Heisler |
| 2016/0173024 A1 | 6/2016 | Itou et al. |
| 2016/0359447 A1* | 12/2016 | Hund ...................... H02S 40/32 |

FOREIGN PATENT DOCUMENTS

| JP | S60-046060 A | 3/1985 |
| JP | 2000-27395 A | 1/2000 |

(Continued)

OTHER PUBLICATIONS

English machine translation of JP 2001-135848 A (Year: 2023).*
(Continued)

*Primary Examiner* — Angelo Trivisonno
(74) *Attorney, Agent, or Firm* — WHDA, LLP

(57) ABSTRACT

A method is disclosed for installing a solar cell module, which enables easy installation of a solar cell module on a rack, and also enables a worker to install a solar cell module without climbing on the roof. A solar cell module is installed on a rack mounted on a roof. The solar cell module includes a frame formed of a material containing a resin. The rack includes multiple rails each having a groove, and the grooves of a pair of the rails are disposed to be opposed to each other. The method of this invention comprises the steps of fitting the frame of the solar cell module into the groove such that the solar cell module is retained by the pair of the rails, and fixing the solar cell module to the pair of the rails (Continued)

to prevent the solar cell module from falling out of the grooves.

4 Claims, 10 Drawing Sheets

(51) Int. Cl.
*E04D 13/00* (2006.01)
*F16M 13/02* (2006.01)

(58) Field of Classification Search
USPC .......................................................... 136/244
See application file for complete search history.

(56) References Cited

FOREIGN PATENT DOCUMENTS

| JP | 2001135848 A | * | 5/2001 | ............. F24S 25/20 |
| JP | 2002-4526 A | | 1/2002 | |
| JP | 2007-180314 A | | 7/2007 | |
| JP | 2012-149402 A | | 8/2012 | |
| JP | 2017-28888 A | | 2/2017 | |
| JP | 2017-139939 A | | 8/2017 | |
| WO | 2016/056985 A1 | | 4/2016 | |
| WO | WO-2016056985 A1 | * | 4/2016 | ............. F24S 25/33 |

OTHER PUBLICATIONS

Office Action dated Jul. 20, 2021, issued in counterpart JP application No. 2017-179351, with English Translation. (5 pages).
Extended European Search Report dated May 19, 2021, issued in counterpart EP Application No. 18858724.0. (7 pages).
International Search Report dated Nov. 20, 2018, issued in counterpart International Application No. PCT/JP2018/034114 (1 page).

* cited by examiner

METHOD FOR INSTALLING SOLAR CELL MODULE

TECHNICAL FIELD

The present invention relates to a method for installing a solar cell module.

BACKGROUND ART

Conventionally, solar cell modules have been installed on the roof of buildings, such as residential houses and carports. Examples of a known method for installing a solar cell module on a roof include a method comprising forming a rack on a roof in advance, and attaching and fixing a solar cell module to the rack.

Solar cell modules usually have a structure in which the edges are surrounded by an aluminum frame (frame material). For such solar cell modules, a method for installing a solar cell module on a roof, the method comprising fixing with clamps, bolts, or the like, a solar cell module to angle bars that are assembled into a lattice, has been frequently used. For example, Patent Literature (PTL) 1 discloses a support structure of a rack in which multiple vertical members and horizontal members are assembled with bolts or the like.

CITATION LIST

Patent Literature

PTL 1: JP2017-139939A

SUMMARY OF INVENTION

Technical Problem

However, the conventional method for installing a solar cell nodule on, e.g., the roof of a residential house or a carport by using a rack would, for example, require a worker to install a solar cell module on the roof and fix the module with a fixing tool, such as a bolt or a clamp. There are problems in this method since the roof, which does not always have sufficient strength, may be damaged by the weight of the worker and the solar cell module when the worker is on the roof carrying the solar cell module, and since there is a high risk of the worker falling off the roof. There is also a restriction that the worker must be skilled since the installation is performed at high locations.

The present invention has been accomplished in view of the above problems. An object of the present invention is to provide a method for installing a solar cell module, which enables easy installation of a solar cell module on a rack that is light enough to reduce the load on the roof, and which also enables a worker to install a solar cell module without climbing on the roof.

Solution to Problem

The present inventors conducted extensive research to solve the above problems, and found that the above object can be achieved when a solar cell module protected by a frame formed of a material containing a resin is installed using rails with a specific shape. The present invention has thus been completed.

More specifically, for example, the present invention encompasses the inventions described in the following items.

Item 1. A method for installing a solar cell module on a rack mounted on a roof, the solar cell module comprising, on at least a portion of the outer periphery, a frame formed of a material containing a resin, the rack including multiple rails each having at least one groove, the grooves of a pair of the rails being disposed to be opposed to each other, the method comprising:

fitting she frame of the solar cell module into the grooves such that the solar cell module is retained by the pair of the rails; and fixing the solar cell module to the pair of the rails to prevent the solar cell module from falling out of the grooves.

Item 2. The installation method according to item 1, wherein the rack further includes cross members that laterally bridge the pair of the rails, and the cross members are interposed between the pair of the rails and the roof.

Item 3. The installation method according to Item 1 or 2, further comprising a step of providing a locking member for locking the solar cell module on at least one end of the rails.

Item 4. The installation method according to any one of items 1 to 3, wherein each of the rails further has at least one groove on a side opposite to the side on which the at least one groove is formed.

Advantageous Effects of Invention

The method for installing a solar cell module of the present invention enables easy installation of a solar cell module on a rack that is light enough to reduce the load on the roof, and also enables a worker to install a solar cell module without climbing on the roof.

DESCRIPTION OF EMBODIMENTS

Embodiments of the present invention are described in detail below.

Figure 1:
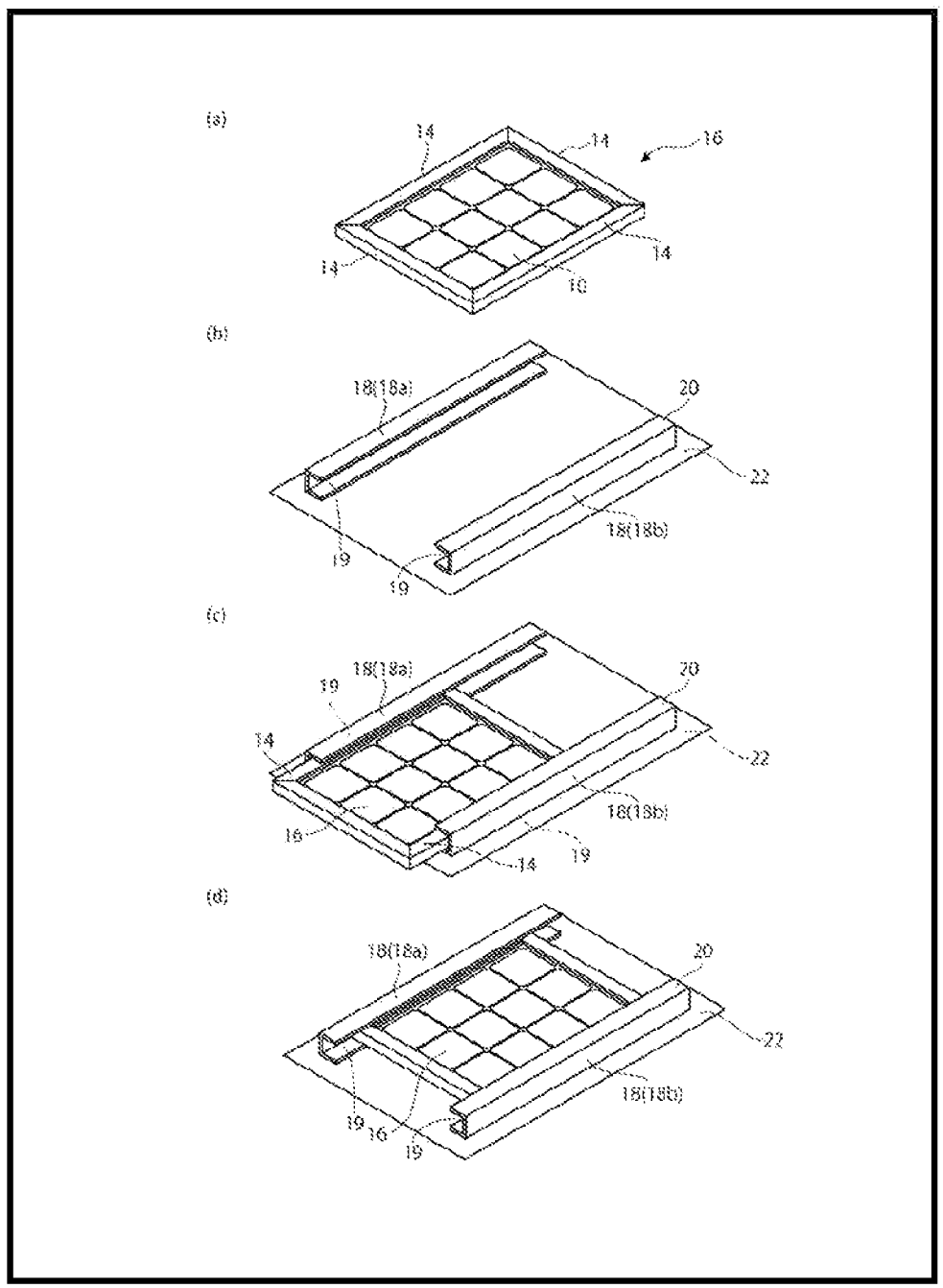
FIG. 1 is perspective views for explaining an example of an embodiment of the method for installing a solar cell module of the present invention: (a) is a perspective view showing an example of the solar cell module to re installed; (b) is a perspective view of a pair of rails mounted on a roof; (c) is a perspective view explaining how a solar cell module is fitted into a pair of rails; (d) is a perspective view explaining a state in which a solar cell module is fitted in a pair of rails.

FIG. 1 is perspective views for explaining an example of an embodiment of the method for installing a solar cell module of the present invention. The method for installing a solar cell module is described below using the embodiment of FIG. 1 as an example.

In the method for installing a solar cell module according to this embodiment (hereinafter abbreviated as "the installation method according to this embodiment"), a solar cell module 16 is installed on a rack 20 mounted on a roof 22.

As shown in FIG. 1(a), in the installation method according to this embodiment, the solar cell module 16 comprises, on at least a portion of the outer periphery, a frame 14 formed of a material containing a resin. As shown in FIG. 1(b), the rack 20 includes multiple rails 18 each having a groove 19, and the grooves 19 of a pair of the rails 18a and 18b are disposed to be opposed to each other.

The frame 14 is configured to cover the entire periphery or a portion of the periphery of the solar cell 10. As described later (see FIGS. 1(c) and 1(d)), at least one pair of side edges of the solar cell module 16 is to be fitted in the grooves 19; therefore, the frame 14 is preferably provided on at least one pair of side edges among the four sides of the solar cell 10, and the frame 14 is more preferably provided on all of the four sides (i.e., the entire periphery) of the solar cell 10.

The type, size, etc. of the solar cell 10 are not particularly limited, and known solar cells can be widely used. The solar cell 10 usually has a rectangular shape in plan view.

Figure 13:
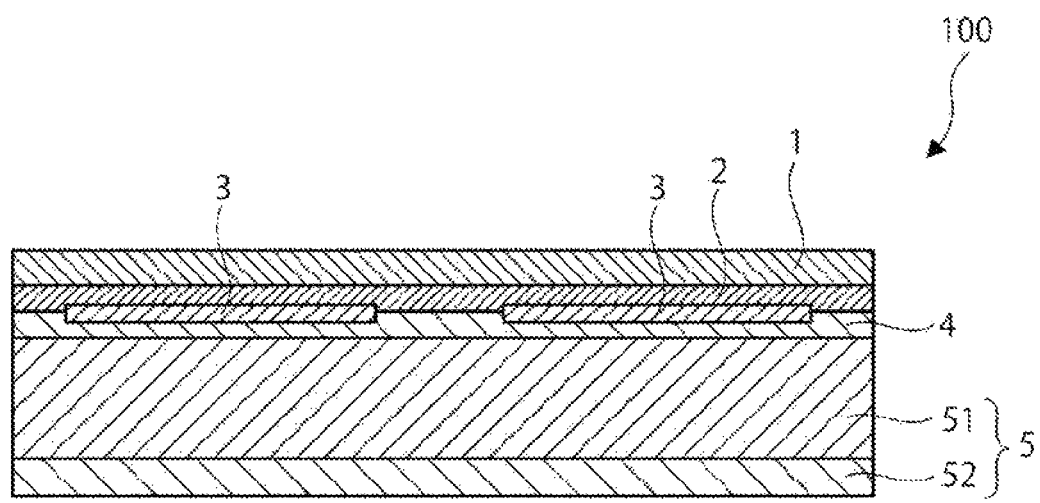
FIG. 13 is a cross-sectional view of n example of a solar cell of a solar cell module that can be installed by the installation method of the present invention.

For example, the solar cell 10 may have a structure comprising, in sequence from a light-receiving surface side, glass, an element sealed with a sealing material, a back sheet, and the like. A preferable embodiment of the solar cell 10 used in the installation method according to this embodiment is described later (FIG. 13).

As long as the frame 14 is formed of a material containing a resin, the type of the resin is not particularly limited. For example, the resin may be one or more resins selected from the group consisting of natural rubber, butadiene rubber, styrene butadiene rubber, butyl rubber, nitrile rubber, ethylene propylene rubber, chloroprene rubber, acrylic rubber, chlorosulfonated polyethylene rubber, urethane rubber, silicone rubber, fluorine rubber, olefin elastomer, ABS, polyethylene, polypropylene, polyvinyl chloride, polycarbonate, polystyrene, and the like. As is clear from this list of examples, the term "resin" as used in the present specification is not limited to thermoplastic resin or thermosetting resin, and is intended to also include materials such as rubber and elastomers.

The frame 14 may be formed only of resin, or may comprise a material other than resin. For example, the frame 14 may be formed of a material containing a resin in an amount of 50 wt % or more, preferably 80 wt % or more, and particularly preferably 90 wt % or more.

The structure of the frame 14 is not particularly limited as long as the frame 14 is configured to cover the side edge surfaces of the solar cell 10. The frame 14 preferably has a shape for covering side edges of the solar cell 10 by enclosing a portion of the surface on a light-receiving surface side of the solar cell 10 and a portion of the surface on the side opposite to the light-receiving surface side.

When the solar cell module 16 is fitted in the grooves 19 of the rails 18a and 18b described later, it is preferable that only the frame 14 is in contact with the grooves 19. More specifically, the frame 14 preferably covers a range of 5 mm or more and 20 mm or less from a side edge of the solar cell 10. In this case, rainwater is sufficiently prevented from permeating into the solar cell 10.

The thickness of the frame 14 is not particularly limited as long as the frame 14 can be fitted in the grooves 19.

The solar cell module 16 comprising the frame 14 can foe produced, for example, by fitting the frame 14 in the side edges of the solar cell 10. For example, by fitting the frame 14 in the four side edges of the solar cell 10, the solar cell module 16 can comprise the frame 14 over the entire periphery.

The solar cell module 16 comprises the frame 14; thus for example, when an impact is applied during, e.g., transportation of the solar cell module 16, breakage of the glass of the solar cell is easily prevented. The solar cell module 16 comprising the frame 14 has improved strength. Additionally, the use of the frame 14 can also contribute to reduction in the weight of the solar cell module 16, compared to the case where an aluminum frame, which was conventionally used, is used. This makes it easier to install the solar cell module 16.

As shown in FIG. 1(b), the rack 20 is configured to include at least multiple rails 18. The rack 20 shown in FIG. 1(b) for installing the solar cell module 16 includes two rails 18, i.e., a pair of rails 18a and 18b.

The rails 18 each have a groove 19. The groove 19 is configured to enclose the frame 14 of the solar cell module 16. The groove 19 is provided over the entire length of the rail 18.

The shape of the groove 19 is not particularly limited as long as the solar cell module 16, in particular, the frame 14, can be inserted.

In the rack 20, multiple rails 18 are disposed in parallel at specific intervals from each other. At least a pair of adjacent rails from among the multiple rails 18 are disposed such that the corresponding grooves 19 are opposed to each other.

In FIG. 1(b), the rack 20 includes a pair of the rails 18a and 18b, and the grooves 19 of the pair of the rails 18a and 18b are disposed to be opposed to each other.

In FIG. 1(b), for example, each of the rails 18 is long and has a substantially U-shaped cross section obtained by bending a flat plate. More specifically, the rails 18 shown in FIG. 1(b) each have a long prismatic shape with an opening on one of the four surfaces in the longitudinal direction. The opening corresponds to the groove 19. The shape of the rail 18 is not limited to the shape shown in FIG. 1(b), and may have another shape as described later.

The material for forming the rail 18 is not particularly limited. For example, the material for forming the rail 18 can be the same as the material conventionally used for a rack for installing a solar cell module. Specifically, the rail 18 can be formed using one or more materials selected from the group consisting of aluminum and iron. The rail 18 is preferably formed of aluminum because aluminum has excellent strength and is easily prevented from rusting due to, e.g., rainwater. When the rail 18 is formed of aluminum, the thickness of the aluminum constituting the rail 18 is preferably 30 mm or more and 100 mm or less. In this case, deformation of the rails 18 caused by the solar cell module 16 is easily prevented, and the rails 18 can easily support the solar cell module 16.

The rack 20 can be formed by mounting multiple rails 18 on the roof 22. The method of mounting the rack 20 on the roof 22, that is, the method of mounting the multiple rails 18 on the roof 22, is not particularly limited. For example, the rails 18 can be mounted on the roof 22 by using a known fixing method using a fixing tool, such as a bolt or a clamp.

The rack 20 may be directly mounted on the roof 22, or an alternate rack may be mounted on the roof 22 in advance, and the rack 20 may be attached to the alternate rack. The alternate rack can have a structure similar to that conventionally used for installing a solar cell module. For example, the alternate rack may have an inclined surface so as to easily receive sunlight.

The installation method according to this embodiment comprises at least the following steps A and B:
step A: fitting the frame 14 of the solar cell module 16 into the grooves 19 such that the solar cell module 16 is retained by a pair of the rails 18 (18a and 18b); and
step B: fixing the solar cell module 16 to the pair of rails 18a and 18b to prevent the solar cell module 16 from falling out of the grooves 19.

In step A, the solar cell module 16 is fitted into each of the grooves 19 of a pair of the rails 18a and 18b. This allows the solar cell module 16 to be retained by the pair of the rails 18a and 18b.

The method of fitting the solar cell module 16 into each of the grooves 19 of the pair of the rails 18a and 18b is not particularly limited.

As shown in FIG. 1(c), for example, the solar cell module 16 is inserted by sliding through the grooves 19 from one end of the pair of the rails 18a and 18b toward the other end (to make the solar cell module 16 fit in by sliding).

As a result, as shown in FIG. 1(d), the solar cell module 16 can be retained by the rails 18 while both side edges of the solar cell module 16 are enclosed by the grooves 19 of the pair of the rails 18a and 18b. In this case, as described above, only the frame 14 of the solar cell module 16 is preferably enclosed by the grooves 19.

Alternatively, it is also possible to allow the solar cell module 16 to be retained by the pair of the rails 18a and 18b, for example, by fitting one end of the solar cell module 16 into one of the grooves 19 of the pair of the rails 18a and 18b, and then fitting the other end of the solar cell module 16 into the other groove 19.

To easily achieve excellent workability for the worker, as shown in FIG. 1(c), the solar cell module 16 is preferably inserted by sliding through the grooves 19 from one end of the pair of the rails 18a and 18b toward the other end. In this case, for example, the solar cell module 16 can be inserted into the grooves 19 even from a position lower than the roof, such as under the roof or the side of the roof, without requiring the worker to climb up on the roof. Therefore, risks during work can be reduced. Further, the load on the roof can also be reduced since the worker does not have to climb up on the roof.

Step A may comprise a step of preparing the solar cell module 16 comprising the frame 14. That is, step A may comprise a step of attaching the frame 14 to the solar cell 10. Alternatively, the step of preparing the solar cell module 16 comprising the frame 14 may be provided before step A, and the solar cell module 16 obtained in this step may be used in step A.

Further, step A may comprise a step of mounting the rack 20 on the roof 22 or attaching the rack 20 to an alternate rack already mounted on the roof 22 (hereinafter abbreviated as "the rack mounting step"). That is, step A may comprise the rack mounting step. Alternatively, the rack mounting step may be performed before step A, and the rack 20 formed by the rack mounting step may be used in step A.

The step of preparing the solar cell module 16 comprising the frame 14 is preferably performed before step A. Further, the rack mounting step is preferably performed after the step of preparing the solar cell module 16 comprising the frame 14. In this case, the rack 20 having a size corresponding to the size of the solar cell module 16 can be mounted on the roof 22.

In step B, the solar cell module 16 is fixed to the pair of the rails 18a and 18b. For example, the solar cell module 16 can be fixed to the pair of the rails 18a and 18b by, for example, locking at least one end of the solar cell module 16 orthogonal to the rails 18, in a state in which the solar cell module 16 is inserted in the rails 18. By step B, the solar cell module 16 is fixed to the rack 20 to prevent sliding out of the grooves 19.

In step B, the method of fixing the solar cell module 16 to the rack 20 is not particularly limited. Examples include a method of fixing the solar cell module 16 to the rack 20 by using a locking member (e.g., a locking member 30 described later).

Figure 2:
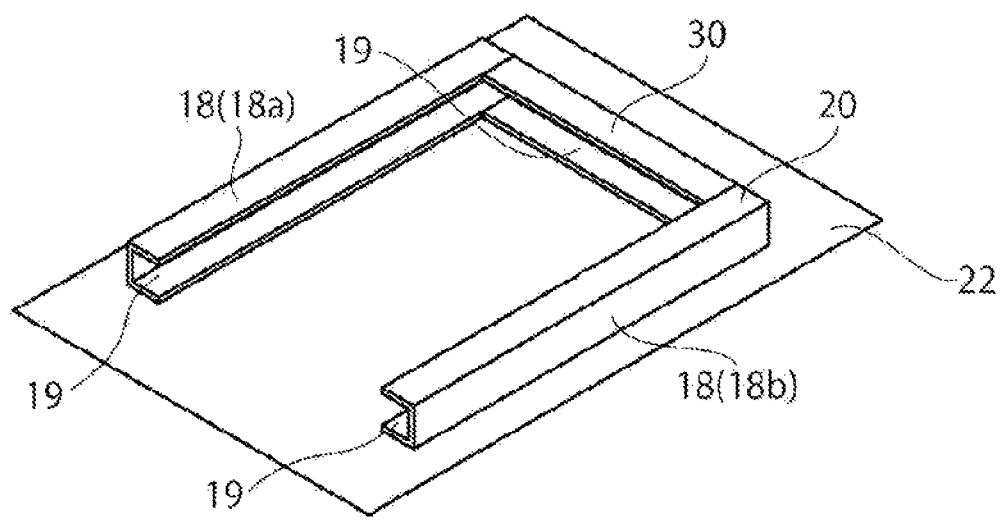
FIG. 2 is a perspective view showing an example of an embodiment of a rack including a locking member that can be used in the method for installing a solar cell module of the present invention.

FIG. 2 is a perspective view of the rack 20 including a locking member 30. The locking member 30 for locking the solar cell module 16 is provided at the terminal end (short side) of the rails 18. In this embodiment, the locking member 30 is provided so as to laterally bridge each end of the pair of the rails 18a and 18b. The locking member 30 may also be provided so as to be sandwiched between the ends of the pair of the rails 18a and 18b.

The shape of the locking member 30 is not particularly limited. For example, for the locking member 30, the same member as the rail 18 can be used. When the same member as the rail 18 is used as the locking member 30, the locking member 30 also has the groove 19. Thus, as shown in FIG. 2, the locking member 30 can be disposed such that the groove 19 faces the space between the pair of the rails 18a and 18b. In the rack 20 formed in this manner, when the solar cell module 16 is inserted between the pair of the rails 18a and 18b, the end of the solar cell module 16 on the insertion side can also be fitted in the groove 19 of the locking member 30. In this case, it is preferable that the frame 14 is also provided on the end of the solar cell module 16 on the insertion side.

The presence of the locking member 30 can prevent the solar cell module 16 from sliding out of the grooves 19, in addition to preventing the solar cell module 16 from passing through the pair of the rails 18a and 18b. Further, when the solar cell module 16 is fixed with the use of the locking member 30, the strength of the solar cell module 16 can also improve in the lateral direction.

From the above viewpoint, the installation method according to this embodiment preferably comprises a step of providing a locking member 30 for locking the solar cell module 16 on at least one end (at least one short side end) of the rails 18. This step may be performed in step A or step B, or may be performed between step A and step B.

The locking member 30 may also be a member other than the rail 18. For the locking member 30, it is also possible to use, for example, a flat or curved metal plate. The locking member 30 does not necessarily laterally bridge the rails 18, and its shape is not particularly limited, as long as the solar cell module 16 is prevented from passing through the rails 18.

The method of attaching the locking member 30 to the rails 18 is not particularly limited. For example, the locking member 30 can be attached to the rails 18 with a fixing tool, such as a bolt or a connector. Alternatively, the locking member 30 can also be attached to the roof 20.

Figure 3:
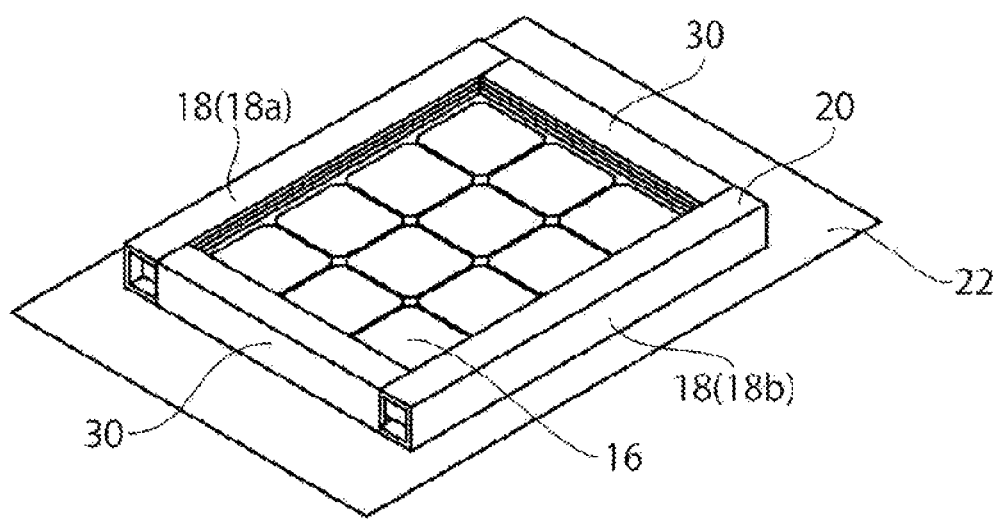
FIG. 3 is a perspective view showing the state of a solar cell module fitted in the rails of a rack including locking members.

As shown in FIG. 3, the locking member 30 may also be provided on a side of the pair of the rails 18a and 18b from which the solar cell module 16 is inserted. In other words, the locking members 30 can be provided at both side edges of the solar cell module 16 orthogonal to the rail 18. The solar cell module 16 is thereby prevented from passing through and sliding out of the rails 18. In this respect, the locking members 30 are preferably provided on both sides of the pair of the rails 18a and 18b, i.e., the insertion side and the terminal end side of the solar cell module 16. The locking member 30 on the insertion side of the solar cell module 16 can also be the same member as the rail 18. The groove 19 of the locking member 30 can be provided so as to face the insertion direction of the solar cell module 16. In this case, all of the four sides (i.e., the entire periphery) of the solar cell module 16 preferably have the frame 14.

The method of providing the locking member 30 on the insertion side of the solar cell module 16 is not particularly limited. For example, after performing step A to allow the solar cell module 16 to be retained by a pair of the rails 18a and 18b, the locking member 30 can be fixed on the insertion side of the solar cell module 16. The method of fixing the locking member 30 is not particularly limited. For example, the locking member 30 can be attached to the rails 18 or the roof 20 with a fixing tool, such as a bolt or a connector. It is also possible that the locking member 30 be provided so as to be sandwiched between the ends of the pair of the rails 18a and 18b.

As described above, the installation method according to this embodiment enables easy installation of a solar cell module on the rack, which is light enough to reduce the load on the roof, and also enables a worker to install a solar cell module without climbing on the roof.

Figure 4:
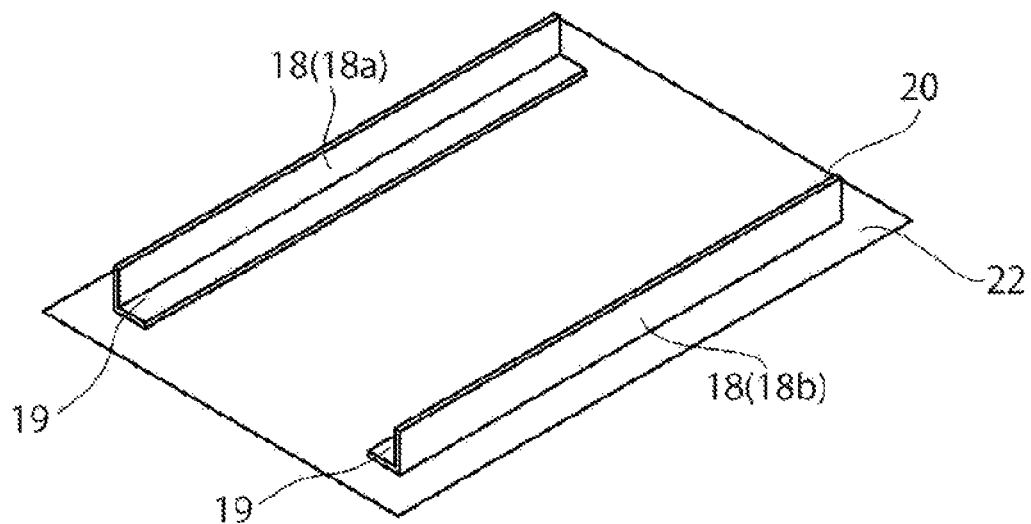
FIG. 4 is a perspective view showing an example of another embodiment of a rack that can be used in the method for installing a solar cell module of the present invention.

FIG. 4 shows another example of the rails 18 that can be used in the installation method according to this embodiment. In this embodiment, each of the rails 18 is long and has an L-shaped cross section. These rails 18 each have the groove 19, which is formed by being surrounded by the two sides of the rail 18.

Figure 5:
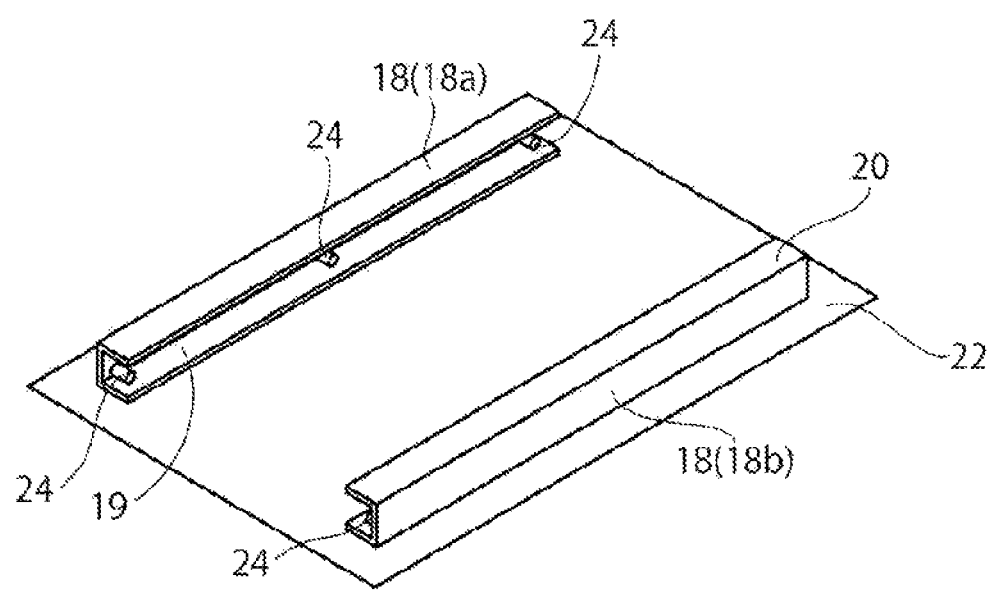
FIG. 5 is a perspective view showing an example of another embodiment of a rack that can be used in the method for installing a solar cell module of the present invention.

FIG. 5 shows another example of the rails 18 that can be used in the installation method according to this embodiment. In this embodiment, each of the rails 18 is provided with roller parts 24. The roller parts 24 allow the solar cell module 16 to more smoothly slide through the grooves 19.

As shown in FIG. 5, the roller parts 24 may be provided on the bottom surface of the groove 19. The roller parts 24 may also be provided on the side surface of the groove 19. For example, multiple roller parts 24 may be provided at intervals in each of the rails 18. The method of attaching the roller parts 24 to the groove 19 is not particularly limited. The material for forming the roller parts 24 is also not particularly limited.

Figure 6:
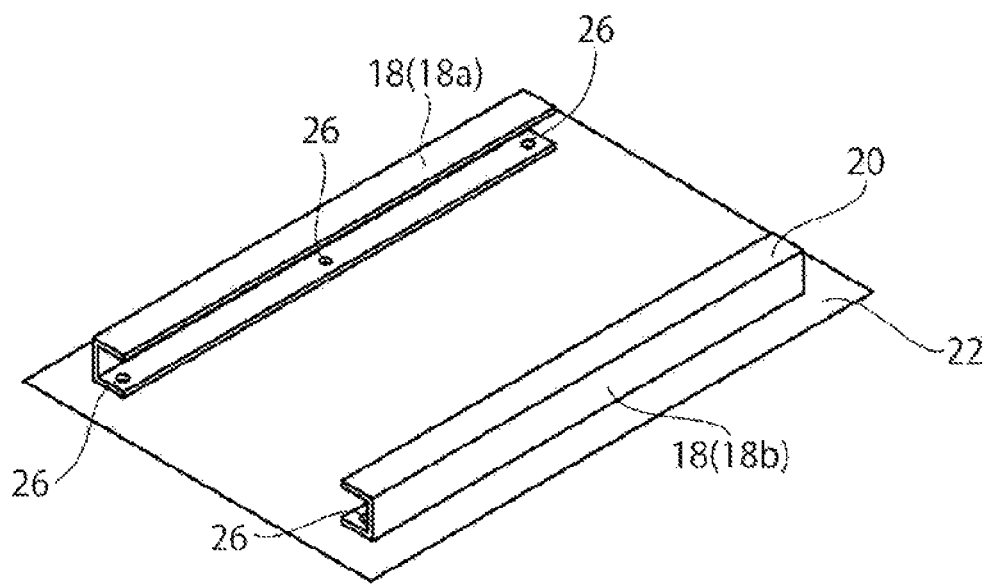
FIG. 6 is a perspective view showing an example of another embodiment of a rack that can be used in the method for installing a solar cell module of the present invention.

FIG. 6 shows another example of the rails 18 that can be used in the installation method according to this embodiment. In this embodiment, each of the rails 18 includes a water passage 26. The water passage 26 can remove, e.g., rainwater that enters the rails. The shape of the water passage 26 is not particularly limited, and may be a through hole or a notch. For example, multiple water passages 26 may be provided at intervals in each of the rails 18. The method of forming the water passages 26 in the groove 19 is not particularly limited. Each of the rails 18 may have both the water passages 26 and the roller parts 24.

In the present invention, each rail 18 preferably has a long prismatic shape with an opening on one of the four surfaces in the longitudinal direction as in the embodiment of FIG. 1(b). The rails 18 according to this embodiment can easily prevent, e.g., lifting of the solar cell module 16 caused by a strong wind or the like.

Although each of the above rails 18 has a single groove 19, it is also possible to provide multiple grooves 19 in each rail 18.

Figure 7:
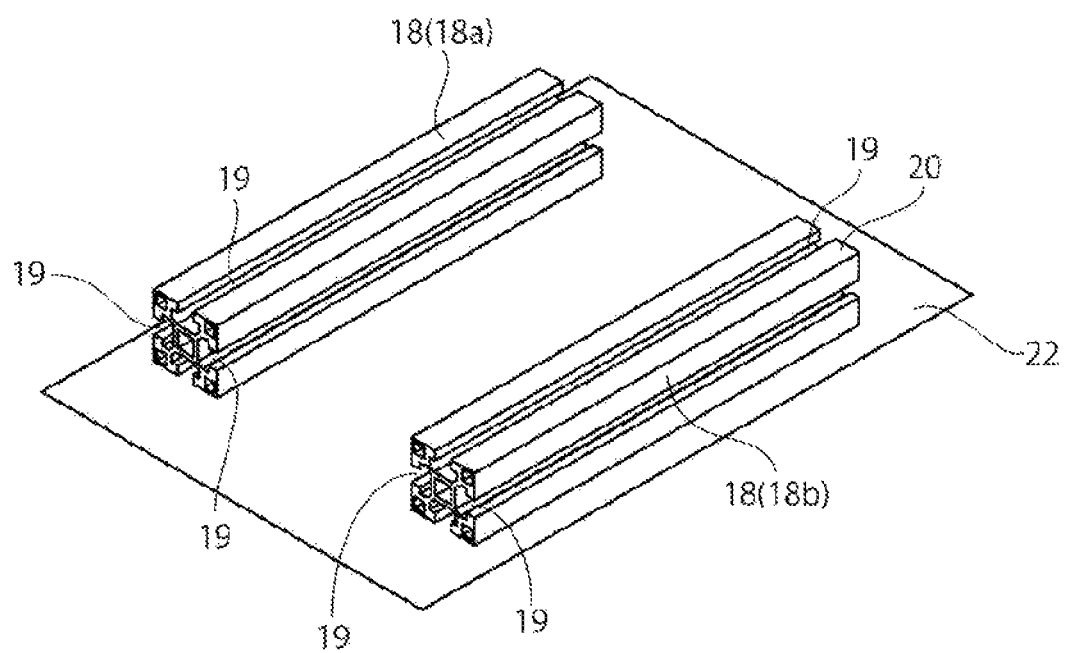
FIG. 7 is a perspective view showing an example of another embodiment of a rack that can be used in the method for installing a solar cell module of the present invention.

FIG. 7 shows still another example of the rails 18 that can be used in the installation method according to this embodiment. In this embodiment, each rail 18 has multiple grooves 19. Specifically, each of the rails 18 according to this embodiment is long and has a rectangular column shape, and each of these rails 18 has the groove 19 on all of the surfaces. When these rails 18 are used, a pair of the rails 18a and 18b can be disposed such that the grooves 19 are opposed to each other, regardless of which surface of the rail 18 faces the other rail 18.

Even when three or more rails 18 according to the embodiment of FIG. 7 are arranged in parallel, the grooves 19 of each pair of the rails 18 are all disposed to be opposed to each other; thus, multiple solar cell modules 16 can be installed on the rack 20.

Accordingly, as in the embodiment of FIG. 7, each rail 18 preferably further has the groove 19 on a side opposite to the side on which the groove 19 is formed. When three or more of the rails 18 are arranged in parallel, the grooves 19 of each pair of the rails 18 can be opposed to each other. This makes it possible to install multiple solar cell modules 16 on the rack 20. As described later (see FIGS. 9 and 10), it is also preferable that each of the rails 18 has two grooves 19 on the same surface so as to provide a back panel of the solar cell module 16.

Figure 8:
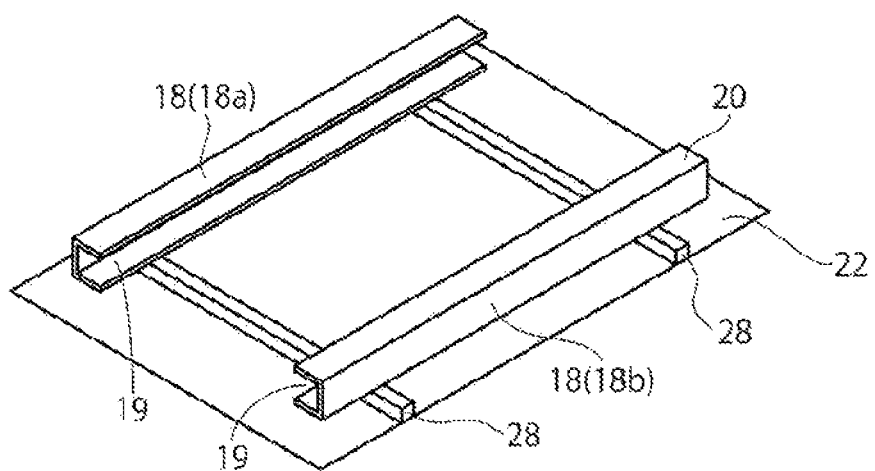
FIG. 8 is a perspective view showing an example of another embodiment of a rack that can be used in the method for installing a solar cell module of the present invention.

FIG. 8 is a perspective view showing another embodiment of a rack that can be used in the method for installing a solar cell module of the present invention. The rack 20 according to this embodiment, further includes cross members 28 that laterally bridge a pair of the rails 18a and 18b. The cross members 28 are interposed between the pair of the rails 18a and 18b and the roof 22. For example, the cross members 28 are each disposed to be orthogonal to the rails 18.

As in the embodiment of FIG. 8, the cross members 28 may be provided on both short sides of the pair of the rails 18a and 18b.

The material for forming the cross member 28 is not particularly limited. For the cross member 28, for example, a square material made of metal, such as aluminum, can be suitably used.

The method of attaching the cross members 28 to the surface of the rails 18 on the roof 22 side is not particularly limited. The cross members 28 can be attached by using a known method, for example, using a fixing tool, such as a bolt.

Further, the method of attaching the cross members 28 to the roof 22 or an alternate rack provided in advance is not particularly limited. For example, the cross members 28 can be attached to the roof 22 or an alternate rack provided in advance, using a fixing tool, such as a bolt. The cross members 28 may be first attached to the rails 18, and then attached to the roof 22; or only the cross members 28 may be first attached to the roof 22, and then, the rack 20 may be formed. Examples of a method of attaching the cross members 28 to the rails 18 include disposing a pair of the rails 18a and 18b in parallel to each other, and attaching and fixing the cross members 28 to the surface of the rails 18 on the roof 22 side, such that the cross members 28 are orthogonal to the rails 18.

The cross members 28 may be attached in step A, or may be attached to the roof 22 in advance before step A.

In the installation method of the present invention, it is advantageous that the rack 20 includes the cross members 28 since a back panel can be provided for covering a junction box, wiring, and the like of the solar cell module 16, as described later. Below, a method for installing a solar cell module that is capable of blindfolding a junction box, wiring, etc. is described in detail.

Figure 9:
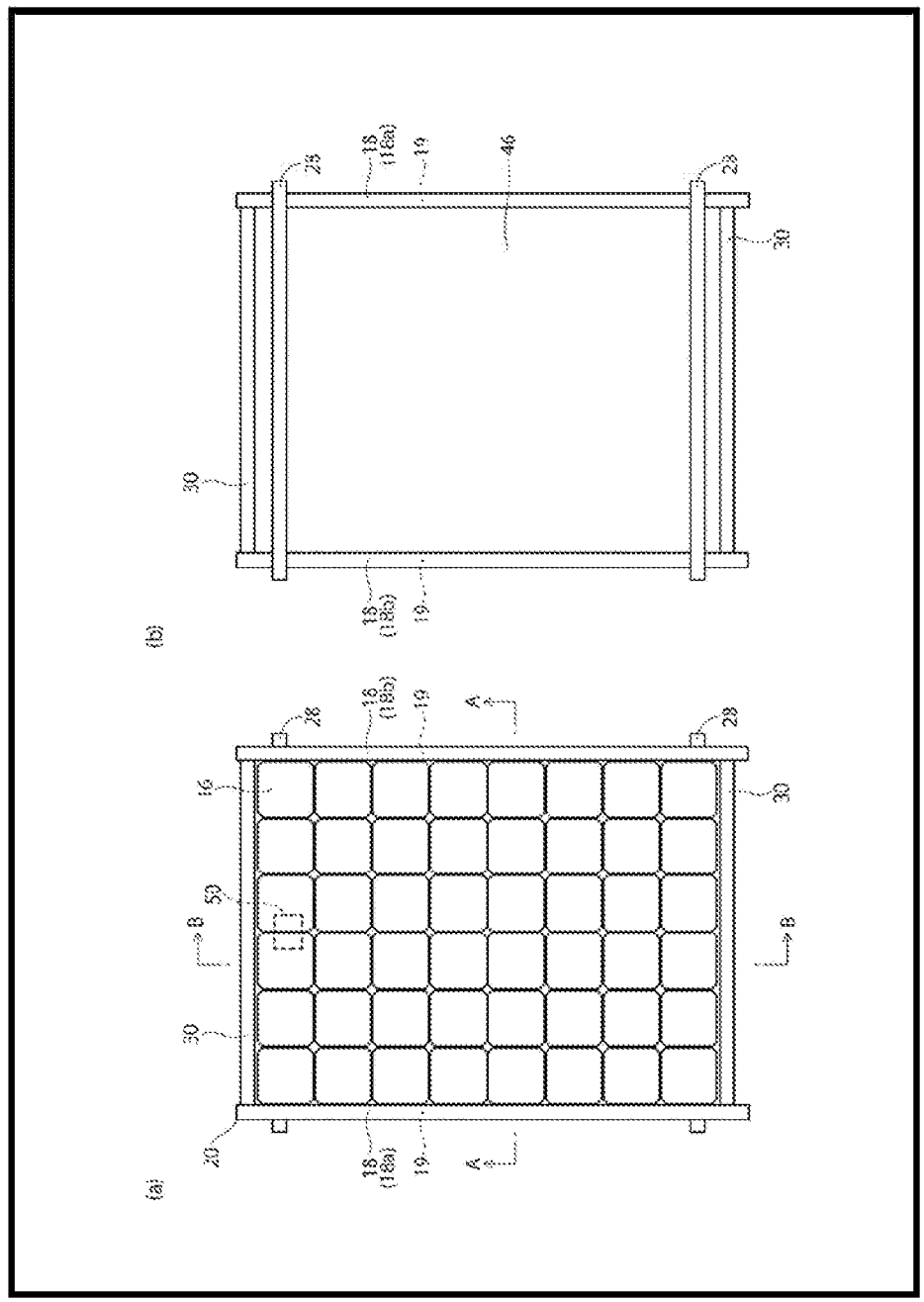
FIG. 9 shows an example of a solar cell module installed on a rack by the method for installing a solar cell module of the present invention: (a) is a plan view from a light-receiving surface side of the solar cell module; and (b) is a plan view from the side opposite to the light-receiving surface side of the solar cell module.
Figure 10:
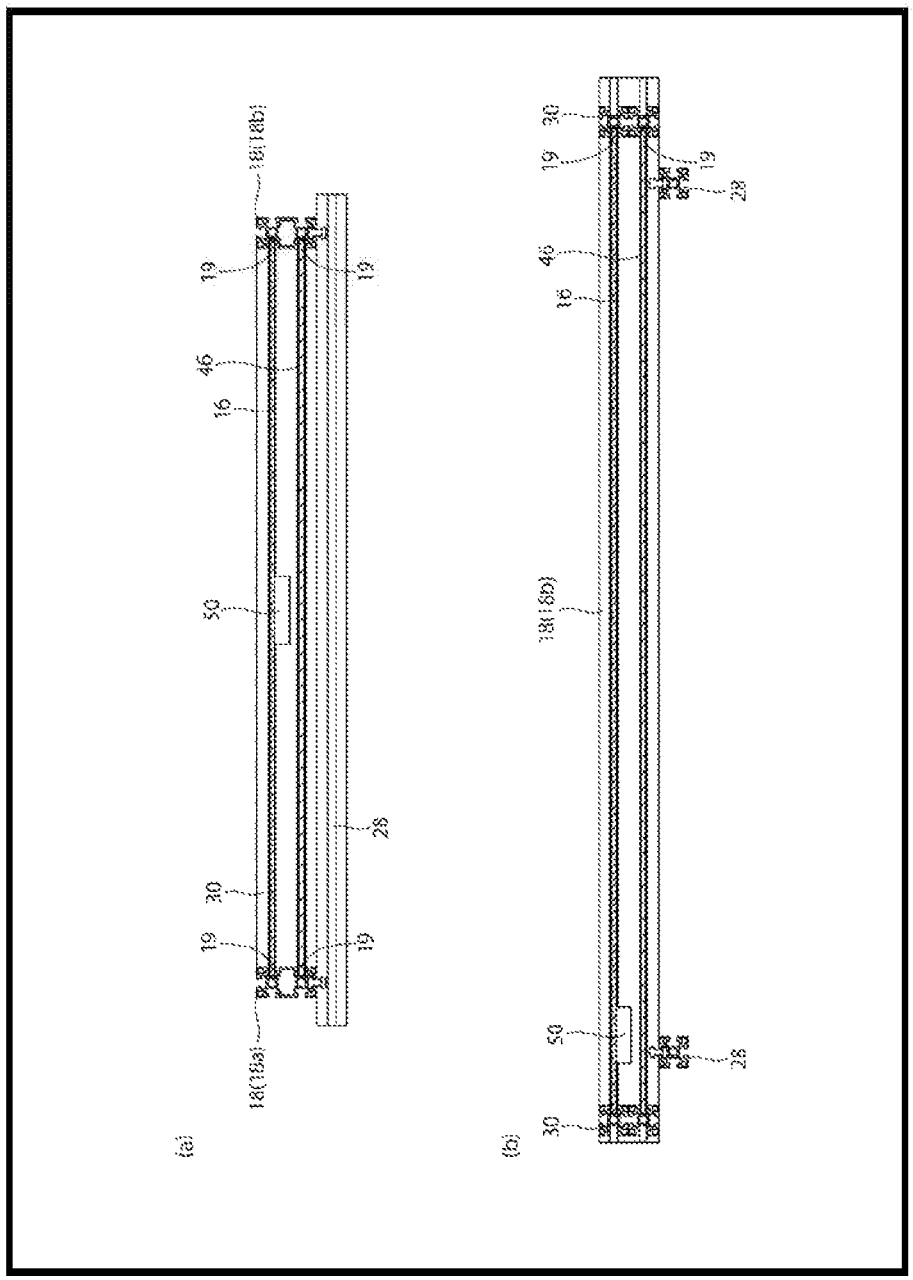
FIG. 10 shows a solar cell module installed by the method for installing a solar cell module of the present invention: (a) is an A-A cross sectional view of FIG. 9(a); and (b) is a B-B cross sectional view of FIG. 9(a).

FIGS. 9 and 10 show an example of installation of a solar cell module installed on a rack by the method for installing a solar cell module of the present invention. FIG. 9(a) is a plan view directly from a light-receiving surface side of the solar cell module 16, and FIG. 9(b) shows the opposite side surface of FIG. 9(a), i.e., a plan view directly from the back surface side of the solar cell module 16. FIG. 10(a) is an A-A cross sectional view of FIG. 9(a), and FIG. 10(b) is a B-B cross sectional view of FIG. 9(a).

FIGS. 9(a) and 9(b) show an embodiment of the installation structure of a solar cell module. In this embodiment, the rack 20 is configured to include a pair of the rails 18a and 18b and the cross members 28. The cross members 28 are attached to the roof 22 (not shown), and attached to both ends of the pair of the rails 18a and 18b on the short side so as to laterally bridge a pair of the rails 18a and 18b. Further, the solar cell module 16 is fitted in and retained by each of the grooves 19 of the pair of the rails 18a and 18b. Additionally, the locking members 30 are attached to each end of the pair of rails 18a and 18b. In this manner, the solar cell module 16 is fixed to the rack 20.

As shown in FIG. 10(a), the pair of the rails 18a and 18b each has two grooves 19 on the same surface. The two grooves 19 are disposed in parallel in the longitudinal direction of each of the rails 18, and the two grooves 19 are disposed at an interval. The solar cell module 16 is fitted in the grooves 19 on a light-receiving surface side, while a back panel 46 is fitted in the grooves 19 on the back surface side. In the embodiment of FIG. 10, each rail 18 has two grooves 19 on each of the four surfaces of the rail 18 in a prismatic shape. The locking member 30 according to the embodiment of FIGS. 9 and 10 may be the same member as the rail 18. The solar cell module 16 can be fitted in the grooves 19 of the locking members 30 on the light-receiving surface side, and the back panel 46 can be fitted into the grooves 19 of the locking members 30 on the back surface side.

The back panel 46 is a plate material for blindfolding a junction box 50, wiring, etc. (not shown) of the solar cell module 16. The presence of the back panel 46 can prevent the junction box 50 and wiring from being visible when a person looks up at the solar cell module 16 from the back surface side of the roof, thus improving the design. In particular, when the roof is highly transparent, such as the roof of a carport, the installation of the back panel 46 is effective. Furthermore, when the junction box 50 comes off from the solar cell module 16, it can be received by the back panel 46, which improves safety.

From the above viewpoints, the installation method of the present invention preferably further comprises a step of installing the back panel 46 on the back surface side of the solar cell module 16. As described above, the back panel 46 is fitted in the grooves 19 of the rails 18.

The size, material, etc. of the back panel 46 are not particularly limited. For example, the back panel 46 can have the same size as the solar cell module 16. Further, the back panel 46 can be formed of, for example, a metal plate, such as aluminum, or a resin plate.

The structure for installation according to the embodiment of FIGS. 9 and 10 may be formed by the same method as described above, i.e., a method comprising at least step A and step B. The back panel 46 can be inserted between a pair of the rails 18a and 18b in the same procedure as inserting the solar cell module 16 between a pair of the rails 18a and 18b. The order of inserting the solar cell module 16 and the back panel 46 is not particularly limited. The back panel 46 may be fitted before step A or in step A.

Figure 11:
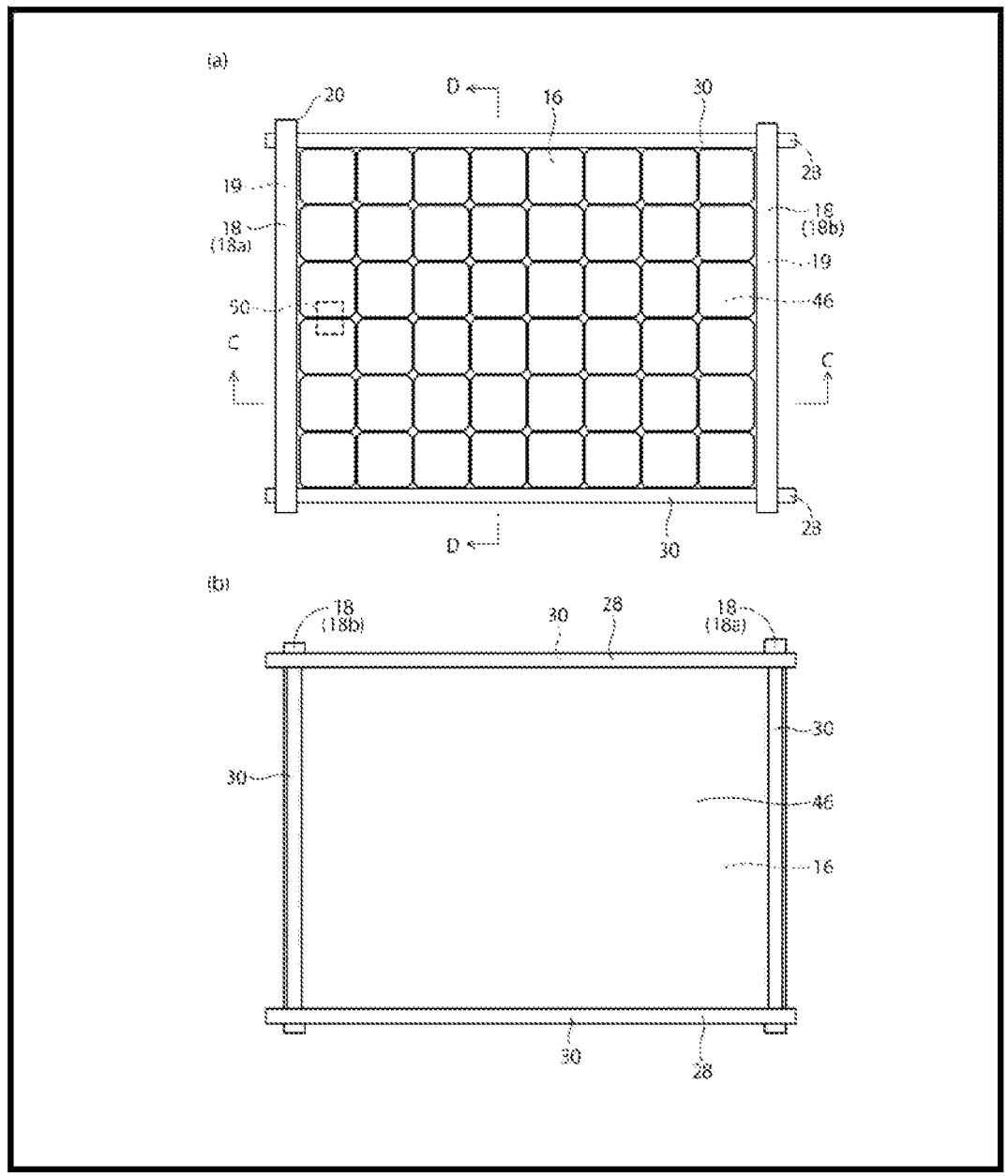
FIG. 11 shows another example of a solar cell module installed on a rack by the method for installing a solar cell module of the present invention: (a) is a plan view from a light-receiving surface side of the solar cell module; and (b) is a plan view from the side opposite to the light-receiving surface side of the solar cell module.
Figure 12:
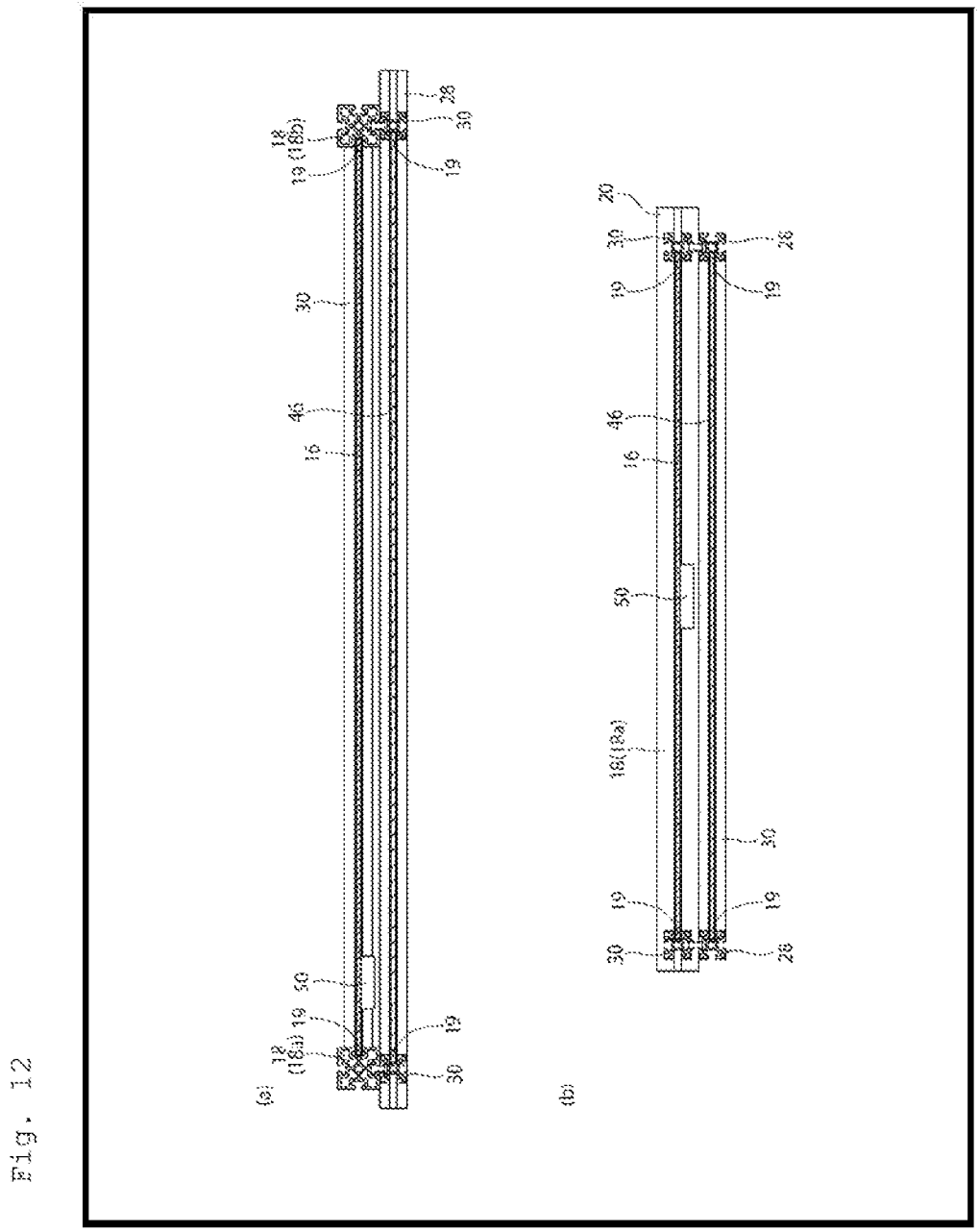
FIG. 12 shows a solar cell module installed by the method for installing a solar cell module of the present invention: (a) is a C-C cross-sectional view of FIG. 10(a); and (b) is a D-D cross sectional view of FIG. 10(a).

FIGS. 11 and 12 show another example of installation of a solar cell module installed on a rack by the method for installing a solar cell module of the present invention. FIG. 11(a) is a plan view directly from a light-receiving surface side of the solar cell module 16, and FIG. 11(b) shows the opposite side surface of FIG. 11(a), i.e., a plan view directly from the back surface side of the solar cell module 16. FIG. 12(a) is a C-C cross sectional view of FIG. 11(a), and FIG. 12(b) is a D-D cross sectional view of FIG. 11(a).

FIGS. 11(a) and 11(b) show an embodiment of the installation structure of a solar cell module. In this embodiment, the rack 20 is configured to include a pair of the rails 18a and 18b and the cross members 28. The cross members 28 are attached to the roof 22 (not shown) so as to laterally bridge the pair of the rails 18a and 18b. Further, the solar cell module 16 is fitted in and retained by each of the grooves 19 of the pair of the rails 18a and 18b. Additionally, the locking members 30 are attached to both ends of the solar cell module 16 of the pair of rails 18a and 18b. In this manner, the solar cell module 16 is fixed to the rack 20.

As shown in FIG. 12(a), the pair of the rails 18a and 18b each have one groove 19 on each surface. The pair of the rails 18a and 18b are the same as the rails according to the embodiment of FIG. 7.

The locking member 30 according to the embodiment of FIGS. 11 and 12 has the same shape as the rail 18, but is smaller than the rail 18. Each of the locking members 30 also has grooves 19, in which the solar cell module 16 fits.

In the embodiment of FIGS. 11 and 12, the locking members 30 are also provided on the back surface side of the pair of the rails 18a and 18b (FIG. 12(a)). The back panel 46 is fitted in the grooves 19 of the locking members 30 disposed on the back surface side of the pair of the rails 18a and 18b. This back panel 46 can be the same as the back panel 46 according to the embodiment of FIGS. 9 and 10.

In the embodiment of FIGS. 11 and 12, each of the cross members 28 also has the groove 19, in which the back panel 46 is fitted (see FIGS. 11(b) and 12(b)). Like the locking members 30, the cross members 28 each having the same shape as the rail 18, but being smaller than the rail 18, are also formed on the back surface side of the pair of the rails 18a and 18b.

More specifically, according to the embodiment of FIGS. 11 and 12, the back panel 46 is fixed by the use of the grooves 19 of the cross members 28 and the locking members 30 on the back surface side of the pair of the rails 18a and 18b.

In the embodiment of FIGS. 11 and 12 as well, the junction box 50 and the wiring can be prevented from being visible from the back surface side of the roof when a person looks up at the solar cell module 16, thus improving the design. Furthermore, when the junction box 50 comes off from the solar cell module 16, it can be received by the back panel 46, which improves safety.

The structure for installation according to the embodiment of FIGS. 11 and 12 may be formed by the same method as described above, i.e., a method comprising at least step A and step B. The back panel 46 can be inserted between a pair of the rails 18a and 18b in the same procedure as inserting the solar cell module 16 between a pair of the rails 18a and 18b. The order of inserting the solar cell module 16 and the back panel 46 is not particularly limited. The back panel 46 may be fitted before step A or in step A.

FIG. 13 is a schematic cross-sectional view of an example of the layer structure of a solar cell 100 of the solar cell module.

The solar cell 100 of FIG. 13 comprises, in sequence from a light-receiving surface side, a surface glass layer 1, a first sealing layer 2, elements 3, a second sealing layer 4, and a back protective layer 5. The back protective layer 5 comprises, in sequence from a side that is in contact with the sealing layers (2 and 4), a first thermoplastic resin layer 51 and a second thermoplastic resin layer 52.

For the surface glass layer 1, for example, known glass conventionally used for a solar cell can be used. The thickness of the surface glass layer 1 may be 0.8 mm or more and 1.6 mm or less. Further, the surface glass layer preferably has a flexural rigidity defined as (flexural modulus×thickness$^3$)/12 of 3000 MPa or more and 25000 MPa or less.

The first sealing layer 2 and the second sealing layer 4 are layers for sandwiching the front surface and the back surface of the cells. The sealing layers may be a known sealing material, such as a copolymer of ethylene and vinyl acetate and a polyolefin. The first sealing layer 2 and the second sealing layer 4 are not necessarily clearly distinguished from each other, and the first sealing layer 2 and the second sealing layer 4 can be regarded as a single sealing layer. The first sealing layer 2 and the second sealing layer 4 preferably have a flexural rigidity defined as (flexural modulus×thickness$^3$)/12 of 1 MPa or more and 10 MPa or less.

The type of the element 3 is not particularly limited, and can be the same as a known solar cell.

The back protective layer 5 comprises a first thermoplastic resin layer 51 and a second thermoplastic resin layer 52. The first thermoplastic resin layer 51 may be in a foam state and have a flexural modulus of 200 MPa or more and 1000 MPa or less. The second thermoplastic resin layer may contain glass fiber and have a flexural modulus of 10000 MPa or more and 25000 MPa or less. Providing the back protective layer 5 having this structure on the back surface of the solar cells can improve the rigidity of the solar cell module.

In addition to the first thermoplastic resin layer 51 and the second thermoplastic resin layer 52, the back protective layer may further comprise other layers as an interlayer or an outermost layer.

The first thermoplastic resin layer 51 contains, for example, a foam body of one or more resins selected from the group consisting of polyethylene, polypropylene, polystyrene, polyurethane, polyethylene terephthalate, polyvinyl chloride, and polymethyl methacrylate. In particular, polypropylene is preferable from the viewpoint of strength, heat, distortion resistance, and weatherability.

The first thermoplastic resin layer 51 preferably has a thickness of 2 mm or more and 6 mm or less, and more preferably 3 to 5 mm or less. In this case, the rigidity of the solar cell module improves, and warping is less likely to occur. The first thermoplastic resin layer 51 preferably has a density of 100 kg/m$^3$ or more and 700 kg/m$^3$ or less. In this case, warping of the solar cell module is less likely to occur, and collapsing of the foam body is less likely to occur.

The first thermoplastic resin layer 51 preferably has a flexural rigidity defined as (flexural modulus×thickness$^3$)/12 of 100 MPa or more and 20000 MPa or less.

For the second thermoplastic resin layer 52, for example, a mixture of glass fiber and one or more resins selected from the group consisting of polyethylene, polypropylene, polyamide, polyurethane, polycarbonate, polymethyl methacrylate, polyethylene terephthalate, polybutylene terephthalate, AS resin, ABS resin, polyacetal, polyphenylene sulfide, polyethersulfone, PEEK, and fluororesin can be used. For the glass fiber, for example, a known material can be used. Specific examples include plain-woven glass cloth.

In the second thermoplastic resin layer 52, the ratio of the glass fiber to the resin may be any ratio. For example, the thermoplastic resin is preferably contained in an amount of 30 parts by weight or more and 70 parts by weight or less, per 100 parts by weight of glass fiber having an average thickness of 1 μm or more and 10 μm or less and an average length of 1 mm or more and 20 mm or less.

The second thermoplastic resin layer 52 preferably has a thickness of, for example, 0.5 mm or more and 2.0 mm or less, and more preferably 0.5 mm to 1.0 mm. In this case, the rigidity of the solar cell module easily improves, and lifting is less likely to occur.

The second thermoplastic resin layer 52 preferably has a flexural rigidity defined by (flexural modulus×thickness$^3$)/12 of 100 MPa or more and 20000 MPa or less.

The solar cell may further comprise an adhesion layer, a weather-resistant layer, a colored layer, and the like. For example, the adhesion layer may be provided on at least one position selected from the following: between the sealing layer and the first thermoplastic resin layer 51; between the first thermoplastic resin layer 51 and the second thermoplastic resin layer 52; and on the surface of the second thermoplastic resin layer 52 opposite to the surface on which the first thermoplastic resin layer 51 is stacked. The weather-resistant layer may be provided on the surface of the second thermoplastic resin layer 52 opposite to the first thermoplastic resin layer 51 side. The colored layer may be provided on the surface of the first thermoplastic resin layer 51 on the side adhering to the sealing layer. The adhesion layer, the weather-resistant layer, and the colored layer can be formed of any known materials.

In the solar cell, the sum of flexural rigidity of the surface glass layer 1, the first sealing layer 2, the second sealing layer 4, and the back protective layer 5 is preferably 4000 MPa or more. The flexural rigidity is defined as (flexural modulus×thickness3)/12. In this case, cracking of the solar cell is easily prevented.

The solar cell module comprising the solar cell 100 shown in FIG. 13 is light, and cracking is less likely to occur. Therefore, by applying such a solar cell module to the method of installing the present invention, the workability is further improved, and the solar cell module can be easily and safely installed. In particular, cracking of the solar cell module is less likely to occur; therefore, even when the solar cell module is larger than conventional modules, e.g., cracking during installation is less likely to occur, thus achieving excellent durability even after installation.

DESCRIPTION OF THE REFERENCE NUMERALS

- 14: frame
- 16: solar cell module
- 18: rail
- 19: groove
- 20: rack
- 22: roof
- 28: cross member
- 30: locking member

The invention claimed is:

1. A method for installing a solar cell module on a rack mounted on a roof, the solar cell module comprising, on at least a portion of the outer periphery, a frame formed of a material containing a resin, the rack including multiple rails each having a first groove and a second groove located below the first groove and extending parallel to the first groove, the first grooves of a pair of the rails being disposed to be opposed to each other, and the second grooves of the pair of the rails being disposed to be opposed to each other, the method comprising:

fitting the frame of the solar cell module into the first grooves such that the solar cell module is retained by the pair of the rails;

fitting a back panel into the second grooves, with at least one of a junction box and a wiring being concealed between the solar cell module and the back panel;

providing a locking member for locking the solar cell module and the back panel on at least one end of the pair of rails; and fixing the solar cell module to the pair of the rails to prevent the solar cell module from falling out of the first grooves.

2. The installation method according to claim 1, wherein the rack further includes cross members that laterally bridge the pair of the rails, and the cross members are interposed between the pair of the rails and the roof.

3. The installation method according to claim 1, wherein each of the pair of rails further has at least one groove on a side opposite to the side on which the at least one groove is formed.

4. The installation method according to claim 2, wherein each of the rails further has at least one groove on a side opposite to the side on which the at least one groove is formed.

* * * * *